United States Patent [19]

Shimizu

[11] Patent Number: 4,773,180
[45] Date of Patent: Sep. 27, 1988

[54] SPINNER BAIT EQUIPPED WITH A LIP

[75] Inventor: Kazuyuki Shimizu, Kobe, Japan

[73] Assignee: Suzuki Sangyo Kabushiki Kaisha, Kobe, Japan

[21] Appl. No.: 147,382

[22] Filed: Jan. 25, 1988

[51] Int. Cl.⁴ .............................................. A01K 85/00
[52] U.S. Cl. .................................. 43/42.11; 43/42.13; 43/42.47
[58] Field of Search ................. 43/42.11, 42.13, 42.19, 43/42.47, 42.14, 42.22

[56] References Cited

U.S. PATENT DOCUMENTS

| 2,503,369 | 4/1950 | Wycech | 43/42.47 |
| 2,729,850 | 5/1973 | Waters | 43/42.47 |
| 2,756,532 | 7/1956 | Trester | 43/42.11 |
| 3,143,824 | 8/1964 | Thomas | 43/42.11 |
| 4,640,041 | 2/1987 | Stanley | 43/42.13 |

Primary Examiner—Gene P. Crosby
Attorney, Agent, or Firm—Frank J. Jordan; C. Bruce Hamburg; Manabu Kanesaka

[57] ABSTRACT

A spinner bait includes an L-shaped shank portion having a first ledger and a second ledger, the two ledgers crossing substantially at right angle with an eye portion for a fishing line provided at the crossing of the two ledgers. A lip member is provided in the shank portion, the lip member being bent into a longer portion and a shorter portion, wherein the longer portion is bent with respect to the shorter portion, and wherein the shorter portion receives the first ledger and second ledger passing therethrough.

2 Claims, 4 Drawing Sheets

SPINNER BAIT EQUIPPED WITH A LIP

BACKGROUND OF THE INVENTION

1. Field of the Invention

The present invention relates to a spinner bait used as a lure in angling, and more particularly to a spinner bait equipped with a lip, the lip increasing the sinking speed of the bait, and upon reception of a pull on the line, allowing it to move about while keeping the same level of depth in water.

2. Description of the Prior Art

A spinner bait as a lure is well known in the art, which revolves in water to attract fish into a place where they can be caught. The known spinner baits are too light to sink in water, so that it disadvantageously takes time before it reaches the bottom of the water (pond, lake or stream). When they are used in a very shallow water such as 2000 mm deep no problem arises, and the anglers can be patient. However, if the water is deep like the lake or sea the anglers become impatient with the slow sinking speed. What is worse, they tend to buoy up because of its light weight, and cannot reach the bottom of the water. Even though they reach there they are difficult to manipulate and keep a constant level of depth in water because of its buoying tendency.

OBJECTS AND SUMMARY OF THE INVENTION

The present invention aims at solving the problems pointed out above, and has for its object to provide a spinner bait capable of sinking at a relatively high speed and manipulating in water at the same level of depth, thereby making the spinner bait effective for catching fish in deep water.

According to the present invention there is provided a spinner bait, which comprises:

an L-shaped shank portion having a first ledger and a second ledger, the two ledgers crossing substantially at right angle;

an eye portion provided at the crossing of the two ledgers, the eye portion being adapted to have a fishing line connected thereto; and a lip member provided in the shank portion, the lip member being bent into a longer portion and a shorter portion, wherein the longer portion is bent toward the fishing line, and wherein the shorter portion receives the first ledger and second ledger passing therethrough.

DETAILED DESCRIPTION OF THE INVENTION

Figure 1:
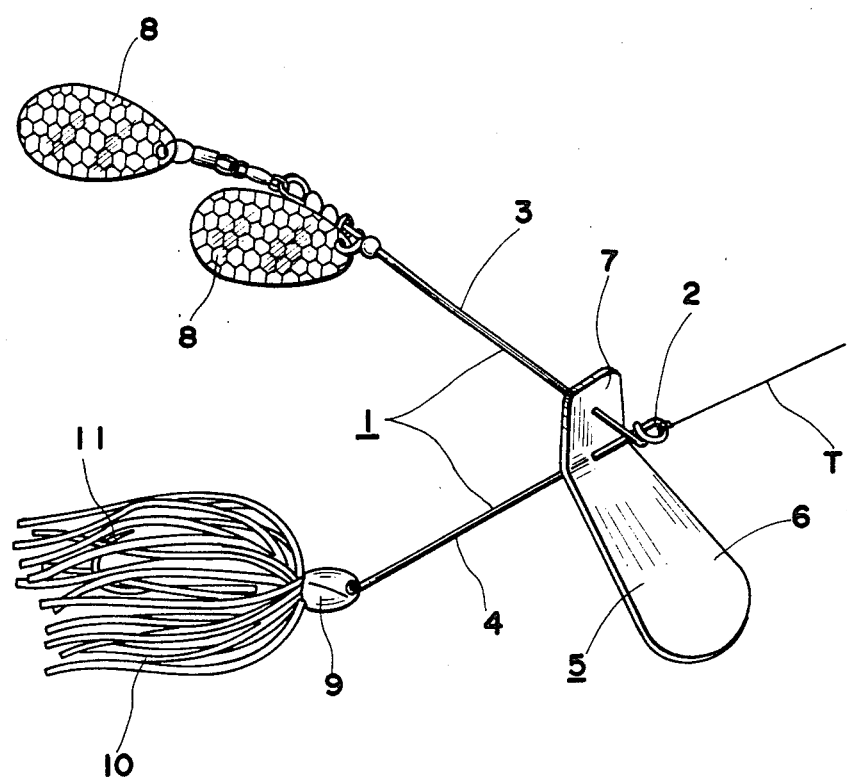
FIG. 1 is a perspective view showing a spinner bait embodying the present invention.
Figure 2:
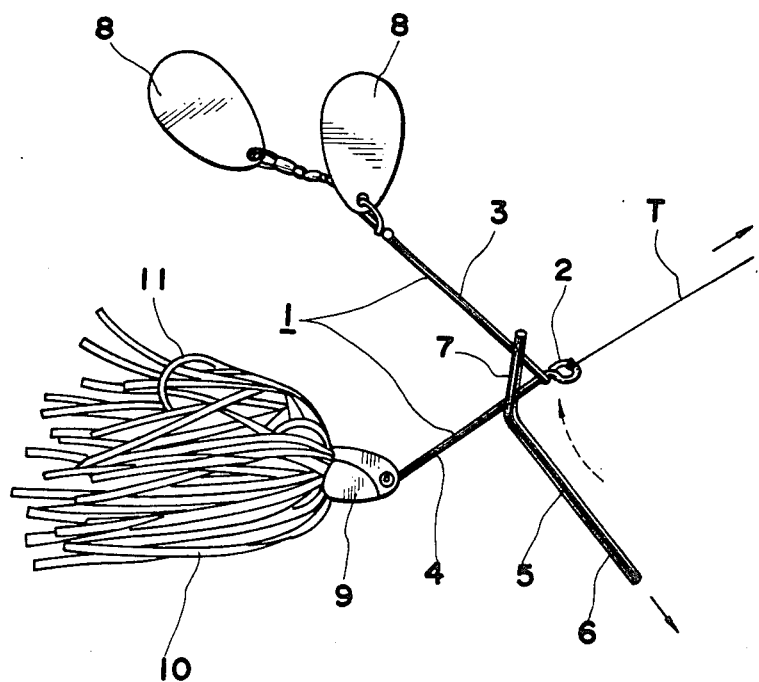
FIG. 2 is a side view of the spinner bait of FIG. 1.
Figure 3:
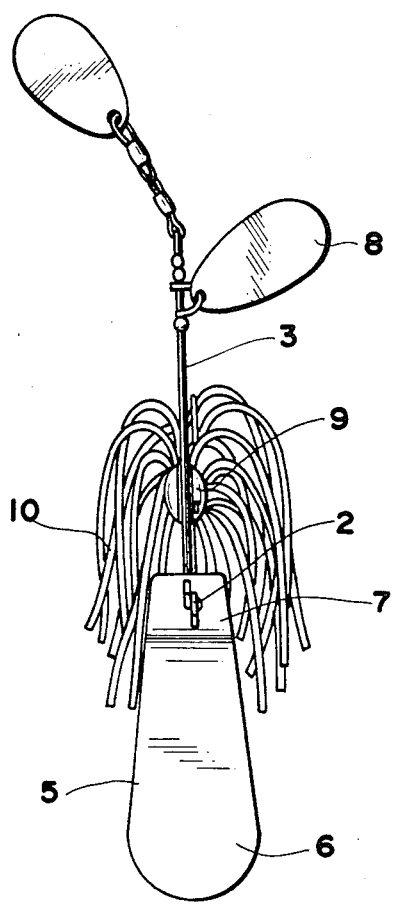
FIG. 3 is a front view of the spinner bait of FIG. 1.

In FIG. 1 there is an L-shaped shank 1 having a first ledger 3 and a second ledger 4 crossing each other substantially at right angle, and an eye 2 at the crossing of the ledgers 3. A fishing line (T) is connected to the eye 2. The shank 1 is provided with a lip 5, which is made of a thin plate, preferably a one-piece tongue-shaped plate. The lip 5 is bent to have a longer portion 6 and a shorter portion 7, wherein the longer portion is bent toward the eye 2, that is, the fishing line (T). The ledgers 3 and 4 pass through the shorter portion 7 as shown in FIG. 2. The first ledger 3 is provided with blades 8 at the opposite end portion thereof to the eye 2, and the second ledger 4 is provided with a head 9 at the opposite end thereof to the eye 2, the head 9 having a skirt 10 which consists of several strips. The reference numeral 10 denotes a hook hidden in the skirt 9.

Figure 4:
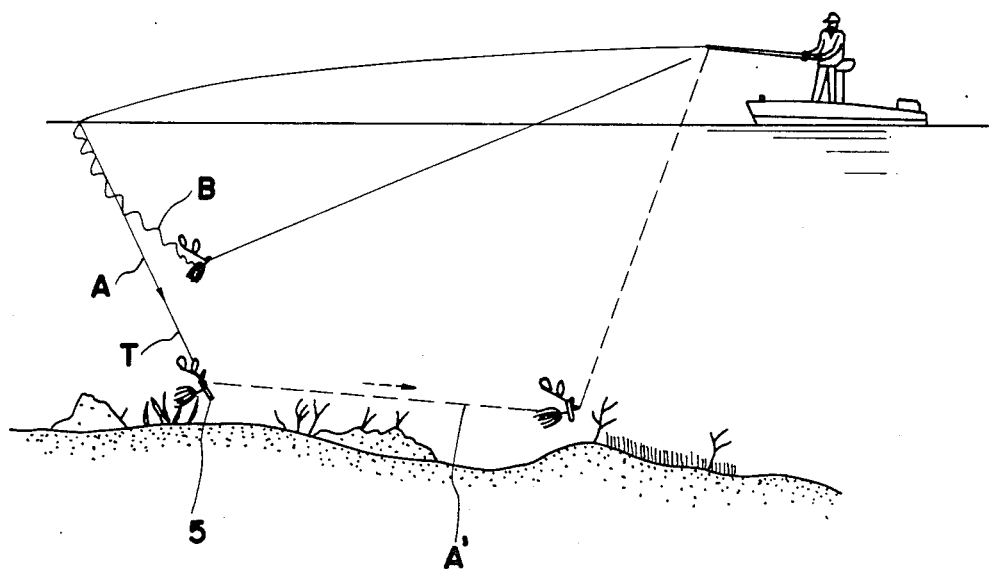
FIG. 4 is a diagrammatic view showing the operation of the spinner bait of FIG. 1.

In operation, when the bait is put into water it sinks at a relatively high speed with the longer portion 6 forward in the direction (A) in FIG. 4, and reaches the bottom of the water. In contrast, the known spinner bait sinks at a slower speed in a zigzag manner because of their light weight. It takes time in reaching the bottom of the water, so that the anglers become impatient.

When the fishing line (T) is reeled in, the bait goes back against the water, wherein the water flows upward along the front surface of the longer portion 6 in the direction of arrow in FIG. 2. The rising force of water urges the bait downward. As a result, the resultant force acts upon the bait, thereby enabling it to move in the direction indicated by (A') in FIG. 4, while keeping the same level of depth.

The lip 5 can be made of plastics or corrosion-resistant metal such as stainless steel or plated metal. The shape of the lip 5 can be various provided that it has a sufficient area for accepting the water thereon.

What is claimed is:

1. A spinner bait used as a lure in angling, the spinner bait comprising:

an L-shaped shank portion having a first ledger and a second ledger, the two ledgers crossing substantially at right angle;

an eye portion provided at the crossing of the two ledgers, the eye portion being adapted to have a fishing line connected thereto; and a lip member provided in the shank portion, the lip member being bent into a longer portion and a shorter portion, wherein the longer portion is bent toward the eye portion, and wherein the shorter portion receives the first ledger and second ledger passing therethrough.

2. A spinner bait as defined in claim 1, wherein the lip member is made of a corrosion resistant metal plate.

* * * * *